United States Patent [19]

Yoshida et al.

[11] Patent Number: 4,716,535
[45] Date of Patent: Dec. 29, 1987

[54] SPEED DETECTION APPARATUS

[75] Inventors: Koichi Yoshida, Kobe; Joji Kawai, Akashi, both of Japan

[73] Assignee: Mitsubishi Denki Kabushiki Kaisha, Japan

[21] Appl. No.: 727,799

[22] Filed: Apr. 26, 1985

[30] Foreign Application Priority Data

May 29, 1984 [JP] Japan .................... 59-111779

[51] Int. Cl.⁴ .................... G05B 5/00; G01P 3/48
[52] U.S. Cl. .................... 364/565; 318/317; 324/166; 73/488
[58] Field of Search .......... 364/178, 179, 481, 565, 364/550; 318/306, 339, 333, 345 E, 311, 393, 636, 317; 324/166; 377/15, 23; 328/155; 73/488, 537

[56] References Cited

U.S. PATENT DOCUMENTS

| | | | |
|---|---|---|---|
| 2,989,678 | 6/1961 | Swartont | 318/309 |
| 3,942,114 | 3/1976 | Keeling | 318/317 X |
| 4,149,116 | 4/1979 | Minakuchi | 318/317 X |
| 4,301,444 | 11/1981 | Bruckert et al. | 377/39 X |
| 4,413,212 | 1/1983 | Okamoto et al. | 318/317 |
| 4,427,933 | 1/1984 | Wagener et al. | 318/345 E X |
| 4,471,452 | 9/1984 | Borchert | 364/179 X |
| 4,489,258 | 12/1984 | Kahlen et al. | 318/317 |
| 4,581,711 | 4/1986 | Hirata et al. | 364/550 |
| 4,621,224 | 11/1986 | Watabe et al. | 318/636 X |

FOREIGN PATENT DOCUMENTS 53-53376  5/1978  Japan .

Primary Examiner—Errol A. Krass
Assistant Examiner—Joseph L. Dixon
Attorney, Agent, or Firm—Leydig, Voit & Mayer

[57] ABSTRACT

A speed detection apparatus for detecting speed of electric equipment on the basis of a sampling interval so as to stably operate a variable speed control system connected thereto.

The sampling interval is varied in accordance with an input current to be supplied to the electric equipment to compensate for different current pulsations due to different modes of operation and the torques produced at different load conditions.

2 Claims, 5 Drawing Figures

SPEED DETECTION APPARATUS

BACKGROUND OF THE INVENTION

This invention relates to a speed detection apparatus. More particularly, it relates to a speed detection apparatus in a control system for an electric equipment subject to a variable speed control, according to which the instability of the control system attributed to mechanical play, etc. within the control system can be absorbed without effecting the responsiveness thereof by rendering a sampling interval variable.

A speed detection apparatus is often used in combination with a speed control system, and it is employed as, for example, the variable speed system of an electric motor such as a thyristor Ward-Leonard system in a steel plant. FIG. 1 is a block diagram of the control system. Numeral 1 designates a D.C. motor, numeral 2 the speed detection apparatus of the specified type which detects the rotating speed of the motor, and numeral 3 a speed controller which provides a reference current command according to the difference between the detected speed and a set speed. On the other hand, numeral 4 indicates a three-phase A.C. power source, and numeral 5 a converter which converts a three-phase alternating current into a variable D.C. voltage source. Shown at numeral 6 is a current sensor which senses the value of current to be fed to the converter. A current controller 7 generates data for adjusting the output voltage of the converter 5, according to the difference between the actual current provided from the current sensor 6 and the reference current command from the speed controller 3. Numeral 8 denotes a gate control circuit which enables or disables switching elements such as thyristors constituting the converter 5, according to the data from the current controller 7. The speed control of the D.C. motor 1 can be performed by varying a feed voltage to the motor. The converter 5 is of the type which can change-over a plus voltage output mode and a minus voltage output mode in accordance with the reference current delivered from the speed controller 3.

In such a system, the control response is enhanced as the sampling interval for speed detection is made shorter. In the presence of play, etc. which occurs in a mechanical system due to, for examples, gears, however, when the sampling interval is short, a great pulsation appears in the detected speed due to the influence of the play, and also the reference current command from the speed controller 3 pulsates greatly. Under such a condition, in a case where a torque to be generated may be small due to light load, a small current average value will incur a state in which the reference current command pulsates between a plus value and a minus value due to the speed pulsation. In consequence, the changeover of the converter for generating a plus voltage and a minus voltage occurs frequently, and the control system becomes unstable under the influence of the dead time of the change-over, etc. When the sampling interval is lengthened in such event, a momentary great pulsation is absorbed, and hence, the fluctuation of the detected speed decreases to stabilize the control system. From the viewpoint of practical use, however, there are many cases where a great torque is required due to a heavy load on the motor as in the case of, e.g., rolling. In such cases, the average current becomes large, and the current pulsation becomes small enough to be neglected relative to the average current. Under this condition, therefore, the sampling interval needs to be set short so as to enhance the responsiveness. In order to stabilize the control system in the whole operating range thereof, accordingly, the sampling interval needs to be varied according to the load.

A prior-art speed detection apparatus of the specified type applied to a variable speed system is disclosed in Japanese Utility Model Registration No. 53-53776. FIG. 2 is a block diagram of the apparatus. A pulse generator 21 generates pulses (denoted by $\phi$) having a frequency proportional to a speed, and a first counter 22 counts the pulses. On the other hand, a pulse oscillator 23 generates pulses (denoted by CLK) having a fixed frequency quite independently of the generator 21, and a second counter 24 counts the pulses. In accordance with a signal provided from a reset circuit 25 at a fixed period $T_s$, the count values of the first counter 22 and the second counter 24 are simultaneously stored into a first register 26 and a second register 27, respectively, while at the same time the first counter 22 and the second counter 24 have their count values cleared to zero to count the numbers of the pulses from zero again. Letting $N_\phi$ and $N_s$ denote the count values stored in the first register 26 and the second register 27 at this point of time, respectively, and $1/t$ denote the frequency of the pulses oscillated from the oscillator 23, the sampling period becomes:

$$T_s = N_s t \qquad (1)$$

Since the number of revolutions N is a value proportional to the number of pulses generated from the pulse generator 21 within a unit time, it can be expressed as:

$$N = K_a \frac{N_\phi}{T_s} \qquad (2)$$

$$= K_b \frac{N_\phi}{N_s} \qquad (3)$$

The rotating speed N can accordingly be obtained in such a way that a CPU 28 executes the operation of Equation (2) by receiving the respective values $N_\phi$ and $N_s$ of the first register 26 and the second register 27. Here, $K_a$ and $K_b$ are proportion constants. That is, the period $T_s$ is the speed measuring period and also serves as the sampling period for the speed detection. This period $T_s$ is determined as follows. FIG. 3 illustrates timings for determining $T_s$. The pulses CLK are generated at the predetermined intervals t by the oscillator 23, and they are counted by the second counter 24. A value $N_c$ is previously set in the counter 24 in hardware fashion, and the point of time at which the next pulse $\phi$ after the count value has reached the value $N_c$ is set as the end of the period $T_s$. Accordingly, when the period of time in which the count value of the second counter 24 reaches $N_c$ is denoted by $T_c$, $$T_c = N_c t \qquad (4)$$

holds, and $T_s \geq T_c$ holds. $T_s = \infty$ holds for an extremely low speed, but in the ordinary state in which at least one pulse $\phi$ is generated during the period $T_c$, the rise of the pulse $\phi$ follows the period $T_c$ before a further period $T_c$ lapses at the latest. For this reason, $$2T_c \geq T_s \geq T_c \qquad (5)$$

holds ordinarily, and $T_s$ is limited by $T_c$.

In the prior-art speed detection apparatus, the frequency 1/t of the oscillator 23 and the set value $N_c$ of the counter 24 are determined by hardware, and they are not easily altered but are fixed during the operation of the speed detection apparatus, so that the sampling period $T_s$ is substantially fixed as $(2 T_c \geqq T_s \geqq T_c)$. Therefore, in case of applying the apparatus to the speed control system of the motor as shown in FIG. 1, when the sampling interval $T_s$ is fixed to a short magnitude, a favorable responsiveness is attained, but the control system might become unstable at the time of a light load. Conversely, when the sampling interval $T_s$ is set at a long magnitude, the control system is stabilized also at the time of a light load, but the responsiveness degrades disadvantageously.

SUMMARY OF THE INVENTION

This invention has an objective to eliminate the disadvantages of the prior-art apparatus as stated above, and has for its main object to provide a speed detection apparatus according to which a sampling interval can be altered at S/W by employing a microcomputer, so the sampling interval corresponding to a load is selected on a real time basis even during the operation of the speed detection apparatus, and a control system can be stabilized in the whole operating range.

DESCRIPTION OF THE PREFERRED EMBODIMENT

Figure 4:
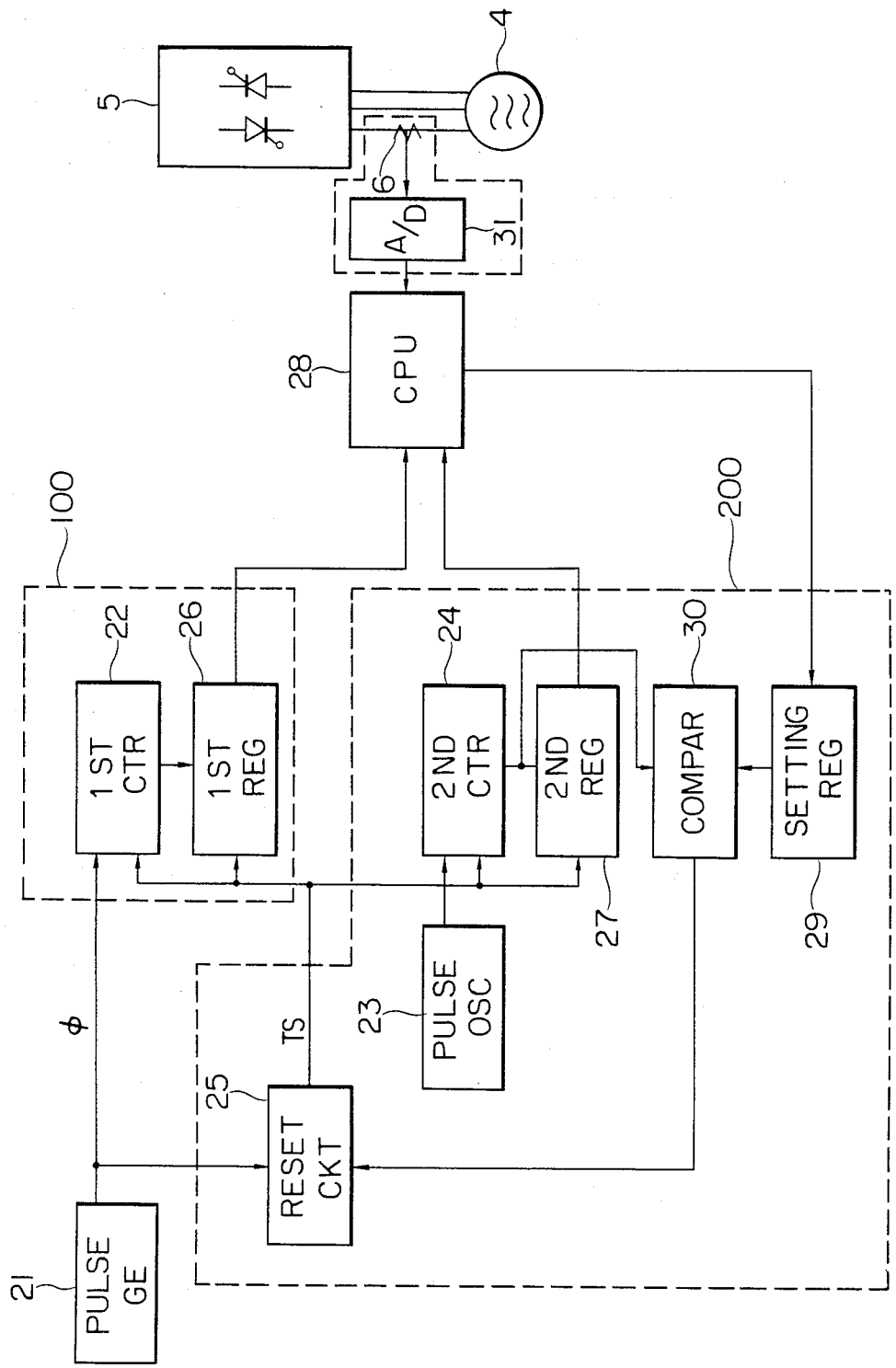
FIG. 4 is a block diagram showing an embodiment of this invention.

FIG. 4 is a block diagram of one embodiment of this invention. Likewise to the prior-art apparatus, the apparatus of the embodiment comprises a pulse generator 21 and a pulse oscillator 23 and a first counter 22 as well as a second counter 24. Further, in order to render $T_s$ variable, there are added a setting register 29 which stores a count value $N_c$ corresponding to $T_c$, and a comparator 30 which compares the count value of the second counter 24 with the value of the setting register 29. A counting unit 100 is constructed of the first counter 22 and a first register 26, while a sampling interval setting unit 200 is constructed of the second counter 24, a second register 27, the comparator 30, the setting register 29, the pulse oscillator 23 and a reset circuit 25. In the prior-art apparatus, the portion corresponding to this sampling interval setting unit has been constructed only of the second counter 24, the second register 27, the pulse oscillator 23 and the reset circuit 25. Therefore, the setting of the count value $N_c$ for commanding the sampling interval $T_s$ must be determined by hardware, and it is difficult to alter $N_c$ on a real time basis during the operation of the speed detection apparatus. The setting register 29 disposed anew is so constructed that it can be directly accessed from a CPU 28 so as to set $N_c$ in software fashion.

As current data for selecting the count value $N_c$, digital data can be applied from a current sensor 6 through an analog-to-digital converter 31 to the CPU 28, and the components 6 and 31 constitute an electrical quantity detecting unit.

Figure 5:
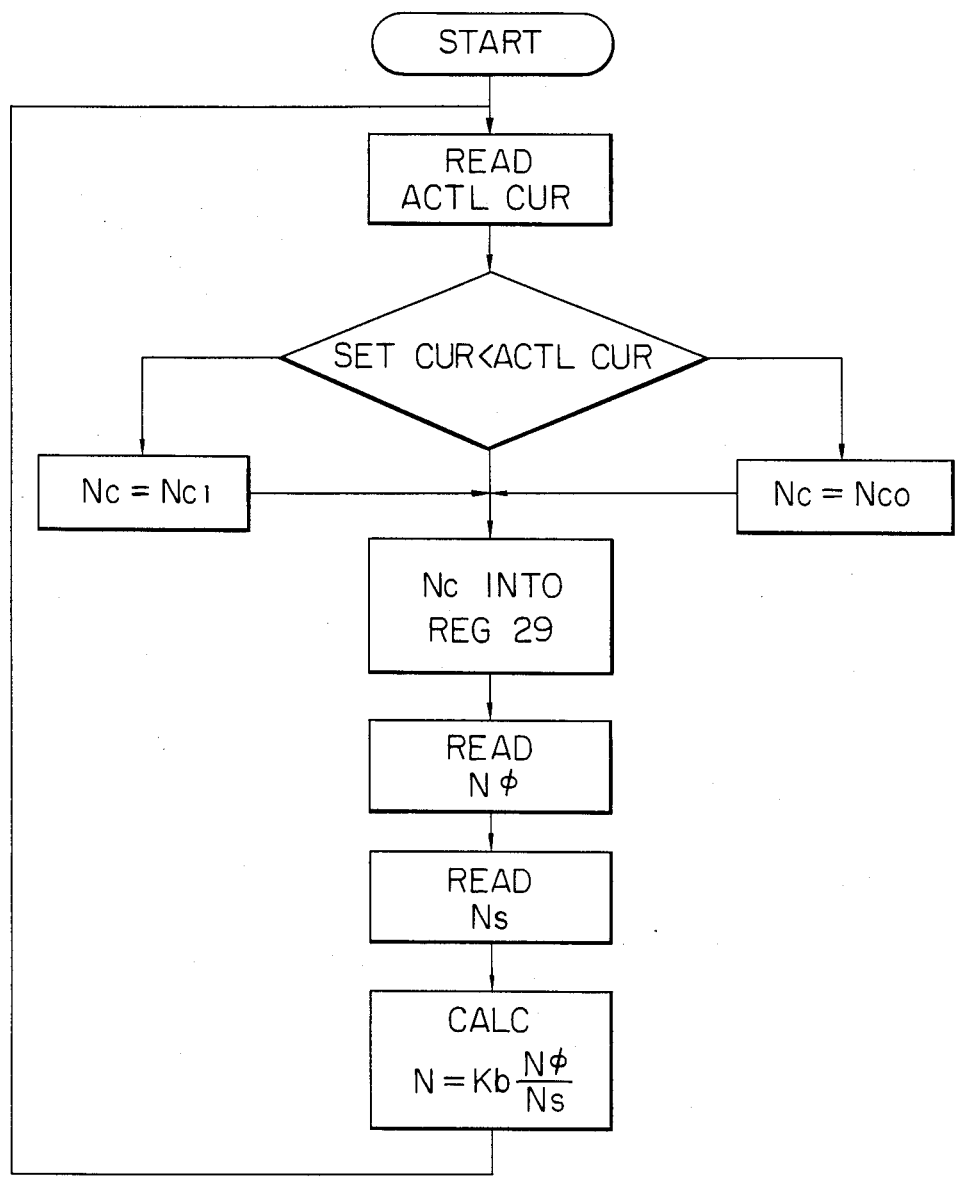
FIG. 5 is a flow chart showing the operation of the embodiment.

Next, the operation of the above embodiment will be described. FIG. 5 is a flow chart of a program which is processed by the CPU 28.

The average value of current to be supplied to a converter 5, which is small and with which the pulsation of current is not negligible relative thereto is set within the program as a set current before the speed detection apparatus starts. When the speed detection device starts, the CPU 28 receives through the A/D converter 31 the value of the actual current to be fed to the converter 5. When the actual current received is greater than the set current previously set, the CPU 28 writes into the register 29 the value $N_{co}$ of the count value $N_c$ for commanding the sampling interval $T_s$ with which the responsiveness of the control system becomes sufficiently favorable. On the other hand, when the actual current is smaller than the set current, the CPU 28 writes into the register 29 the value $N_{cl}(>N_{co})$ of the count value $N_c$ for commanding the sampling interval $T_s$ with which the pulsation of the current does not affect the control system. The counter 24 counts pulses CLK generated by the pulse generator 23 which generate pulses of a fixed frequency 1/t. The count value and the value $N_c$ stored in the register 29 from the CPU 28 are compared by the comparator 30, and the point of time at which they become equal is detected, whereby the period of time $T_c$ can be measured. The reset circuit 25 is actuated at the point of time at which the first pulse $\phi$ after the lapse of the period $T_c$ rises (and at which the sampling interval $T_s$ ends) Thus, the count values $N_\phi$ and $N_s$ of the counters 22 and 24 are respectively stored into the registers 26 and 27, and the counters begin to count from zero again. Meanwhile, the CPU 28 reads the stored values $N_\phi$ and $N_s$ out of the registers 26 and 27 and calculates $N = K_b N_\phi / N_s$ of Equation (3), whereby the rotating speed N can be obtained.

The above operations are repeatedly performed. With such arrangement, the value $N_c$ can be set on-line by the CPU 28, so that the sampling interval can be controlled on a real time basis according to the magnitude of the actual current.

In the embodiment, the sampling interval $T_s$ has been controlled in accordance with Equation (4), $T_s = 32 N_c t$ by rendering the value $N_c$ variable on-line by means of the CPU. However, $T_s$ can be controlled by rendering t variable. By way of example, even in a case where $N_c$ is fixed, t can be controlled on-line with the CPU by employing a programmable counter as the oscillator 23. The programmable counter is constructed so as to divide the fixed frequency of input clock pulses and to supply the counter 24 with the frequency-divided clock pulses as input reference clock pulses, and it is made possible to set the ratio of the frequency division in software fashion by means of the CPU. Then, an effect equivalent to the effect described before can be attained. With this arrangement, the setting register 29 for setting $N_c$ and the comparator 30 are dispensed with. By the way, $T_s$ can be finely set with an arrangement which controls both $N_c$ and t.

This speed detection apparatus can detect, not only the speed of a rotary machine, but also the speed of a rectilinear motion, as long as a mechanism which generates pulses at a frequency proportional to the speed is included.

Further, the embodiment has been so constructed that the CPU 28 is employed as the calculating portion so as to perform the operation of Equation (3) in software fashion within the CPU, but the calculating portion may well be a digital multiplier/divider unit of hardware construction. Besides, in a case where the contents of the first register 26 and the second register 27 are turned into analog values by D/A conversion, analog multiplication/division may well be used.

The actual current data received from the current sensor 6 of the electrical quantity detecting unit is proportional to the torque to be generated by the rotary machine. In view of this point, a similar effect is attained even with an arrangement in which feed power being the input of the rotary machine, as opposed to the generated torque being the output thereof, is detected by the electrical quantity detecting unit so as to set the sampling interval.

Figure 1:
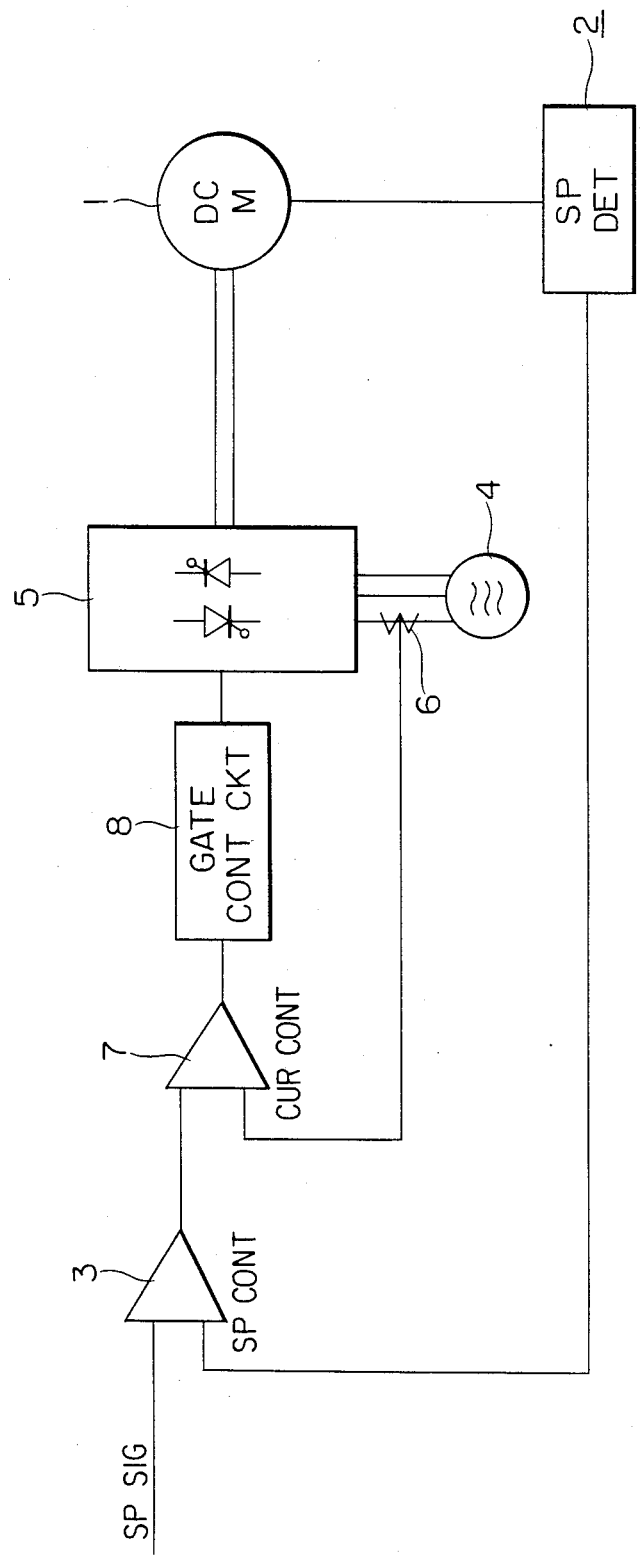
FIG. 1 is a system diagram of a control system to which a speed detection apparatus is applied.
Figure 2:
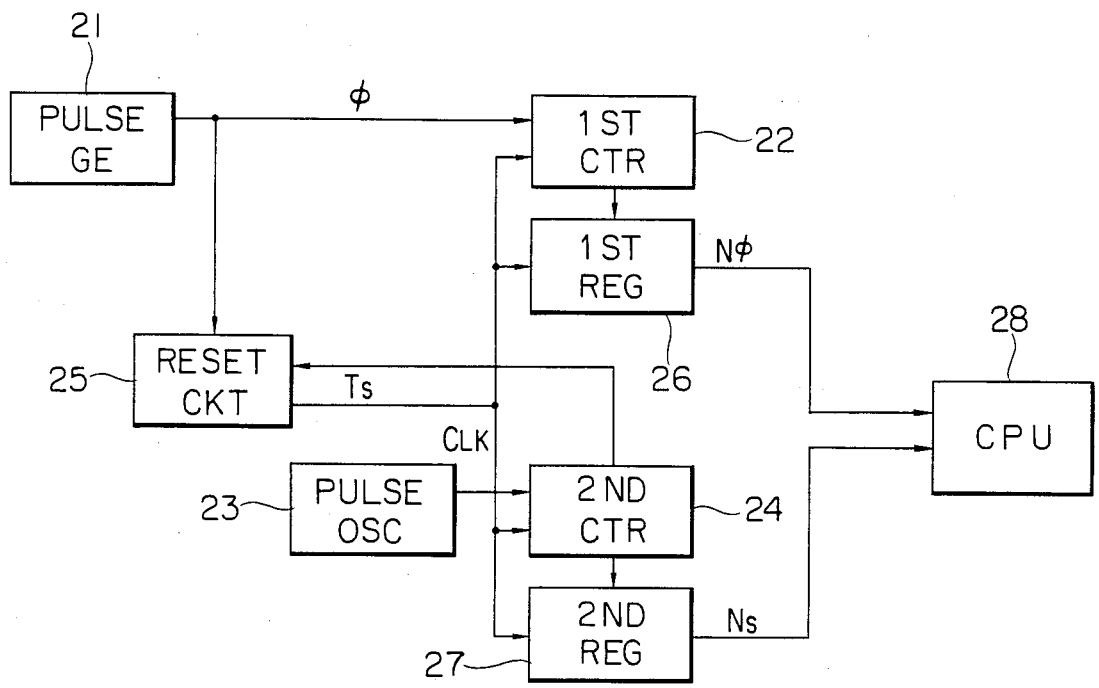
FIG. 2 is a block diagram showing a prior-art apparatus.
Figure 3:
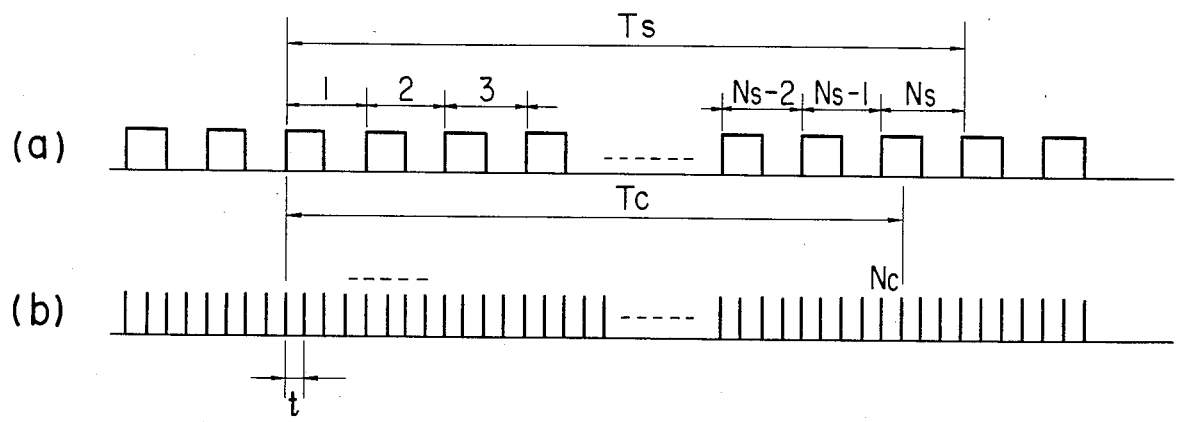
FIG. 3 is a chart of speed detection timings.

As described above, according to this invention, a sampling interval $T_s$ is set on-line at will, which brings forth the effect that the proper sampling interval $T_s$ can be selected on a real time basis according to a running state or running conditions and that a stable control system of favorable responsiveness is provided. For example, in the application of the speed detection apparatus of this invention to a system such as the thyristor Ward-Leonard system for use in the steel plant or the like shown in FIG. 1, when an average current value is small to the extent that current fluctuations attributed to the pulsation of a detection speed are not negligible for the stability of the control system, the pulsation of the detection speed can be suppressed to stabilize the control system by setting $T_s$ to be larger or $N_c$ to be larger on a real time basis. On the other hand, in a case where a great torque is required due to a heavy load acting on the motor, the average current increases, the fluctuations of the reference current attendant upon the speed pulsation become relatively negligible, and the responsiveness becomes important. In this case, a favorable responsiveness can be attained by setting $T_s$ to be smaller or $N_c$ to be smaller. In this manner, the proper sampling interval $T_s$ is set according to the running state, whereby a system which is stable in the whole operating range and which exhibits favorable responsiveness can be formed.

What is claimed is:

1. In a variable speed system for electric equipment, a speed detection apparatus for detecting speed of the electric equipment on the basis of a sampling interval so as to stably operate the control system, said speed detection apparatus comprising a pulse generator for generating signal pulses proportional to speed of the electric equipment, an electrical quantity-detecting unit for detecting an electrical quantity to be applied to the electric equipment, a sampling interval setting unit for changing a sampling interval responsive to variations in the electrical quantity, a counting unit connected to the sampling interval setting unit for counting signal pulses generated by said pulse generator in accordance with the sampling interval, and a calculating unit for determining speed of the electric equipment required for smooth operation on the basis of said counted signal pulses and said set sampling interval.

2. In a variable speed system for electric equipment, a speed detection apparatus for detecting speed of the electric equipment on the basis of a sampling interval so as to stably operate the control system, said speed detection apparatus comprising a pulse generator for generating signal pulses proportional to speed of the electric equipment, an electrical quantity-detecting unit for detecting an electrical quantity to be applied to the electric equipment, a sampling interval setting unit for changing a sampling interval responsive to variations in the electrical quantity, a counting unit connected to the sampling interval setting unit for counting signal pulses generated by said pulse generator in accordance with the sampling interval, and a calculating unit for determining speed of the electric equipment required for smooth operation on the basis of said counted signal pulses and said set sampling interval, said electric quantity-detecting unit including a current detector for detecting an input current to the electric equipment, said counting unit including a first counter for counting said signal pulses and a first register for storing therein said counted signal pulses in response to an external reset signal, said sampling interval-setting unit including a reset circuit for generating said external reset signal, a setting register for setting a set value in response to the input current detected by said current detector, a pulse oscillator for generating clock pulses at a predetermined frequency, a second counter for counting clock pulses from said pulse oscillator, a second register for storing therein said counted clock pulses in response to said external reset signal, a comparator for comparing said set value and said counted clock pulse, and said calculating unit including a CPU.

* * * * *